United States Patent Office

2,952,698
PREPARATION OF ALKYL ALUMINUM COMPOUNDS

Arthur Homer Neal, Joseph Kern Mertzweiller, and James Francis Ross, Baton Rouge, and Clyde Lee Aldridge, Baker, La., assignors to Esso Research and Engineering Company, a corporation of Delaware No Drawing. Filed Dec. 21, 1955, Ser. No. 554,394

6 Claims. (Cl. 260—448)

The present invention relates to the preparation of alkyl aluminum compounds useful as catalyst components and intermediates in the synthesis of various products such as hydrocarbon polymers, oxygenated compounds including alcohols, etc. from low molecular weight unsaturated organic starting materials. More particularly, the invention pertains to the preparation of mono- or dialkyl aluminum halides, alkyl aluminum sesquihalides, or trialkyl aluminum compounds, in which the alkyl groups are saturated aliphatic hydrocarbon radicals. In its broader aspect, the invention contemplates reacting the starting materials for the formation of these alkyl aluminum compounds in the presence of an inert hydrocarbon diluent or solvent for the non-metal reactants and reaction products.

Alkyl aluminum compounds have been prepared heretofore by contacting finely divided metallic aluminum or aluminum alloy with alkyl halides in the presence or absence of preformed alkyl aluminum halide or by reacting an alkyl aluminum halide with a reducing metal, such as sodium, magnesium or various solid or liquid alloys of these metals. Intimate contact of the reactants and careful temperature control are indispensable for these exothermic reactions when optimum yields and consistent product characteristics are desired. Complicated grinding and/or metal activating procedures have been necessary heretofore to assure satisfactory results. The present invention overcomes, or greatly alleviates, this drawback and affords various additional advantages as will appear from the detailed description hereinafter.

It has now been found that alkyl aluminum materials composed of compounds of the type $R_aAlX_b$ wherein R is a saturated aliphatic hydrocarbon radical, particularly such a radical having 1–10, preferably 2–8, carbon atoms, X is a halogen, $a$ is an integer from 1–3 and $b$ is an integer from 0–2 such that $a+b=3$, may be prepared by reactions between alkyl- and halogen-containing compounds and reducing metals, in the presence of aluminum-containing materials without encountering the above-mentioned drawbacks when the starting materials are contacted with each other in the presence of an inert liquid hydrocarbon diluent or solvent for the reaction products and the reactants other than metals. The process of the invention affords improved contacting of the reactants, improved heat transfer and temperature control, greater ease of mixing and better and more consistent yields. The hydrocarbon solvent or diluent used is preferably non-olefinic and non-aromatic, boiling not substantially below the maximum temperature of the reaction forming the alkyl aluminum compounds.

In accordance with a specific embodiment of the invention, the diluent should boil close to or at the maximum reaction temperature desired but not substantially above the boiling point of the desired product. In this case, side reactions due to excessive temperatures may be avoided because the diluent may be refluxed, whereby any excess heat is dissipated. In this manner, overheating is readily avoided even at maximum reaction rates.

In accordance with another embodiment of the invention, the diluent should have a boiling point or boiling range similar to that of the desired product. This embodiment permits distillation of the product together with diluent. Thus, the product is obtained in the form of a solution which is ready for use as a catalyst or intermediate as such or in the subsequent preparation of compounded catalysts, particularly in the preparation of polymerization catalysts of the alkyl aluminum-titanium halide type used in low pressure olefin polymerization.

A still further embodiment of the invention contemplates the use of diluents which boil above the boiling temperature of the alkyl aluminum product desired. In this manner, some of the diluent will remain in the reaction vessel upon distillation of the product whereby the inorganic salts formed as by-products and/or unconverted aluminum are prevented from caking in the reaction vessel. In addition, product recovery upon distillation may be more complete because the less volatile diluent will exert a "chasing" action in the final distillation stage. Also, the use of such a high boiling diluent is conducive to the initial recovery of a pure undiluted product upon stripping of the alkyl aluminum product from the reaction mixture.

Inert hydrocarbon solvents useful for the purposes of the present invention are preferably saturated hydrocarbons or hydrocarbon oils boiling not substantially below 150° C. and most desirably between about 200° and 350° C., e.g. a diluent boiling above about 260° C. Examples of suitable diluents include normal saturated paraffinic hydrocarbons such as decane, tetradecane and their higher homologues, saturated naphthenic hydrocarbon oils, petroleum oils, especially acid treated petroleum oils including white oil, heavy naphthas, suitable kerosene fractions, middle distillates, light gas oils, and other stocks from which olefin and aromatic components have been removed, etc. Desirable proportions of diluent range from 5–100%, preferably from 10–50% based on the weight of alkyl aluminum product to be obtained.

The invention is applicable to all known methods of preparing alkyl aluminum compounds. One such method is the preparation of alkyl aluminum sesquihalides from aluminum metal and alkyl halide according to the equation:

$$2Al + 3RCl = R_2AlCl + RAlCl_2$$

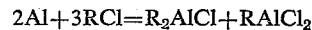

Heretofore, in this process powdered aluminum has been first activated by wetting it with preformed alkyl aluminum sesquihalide, particularly bromide and the so-activated aluminum was contacted with alkyl halide usually in the gaseous state. When the invention is applied to this reaction, the aluminum powder along with the sesquihalide may be suspended in one of the hydrocarbon diluents above specified and the alkyl halide may be directly introduced into the suspension formed. In the case of ethyl aluminum sesquichloride as the desired product, diluents such as normal decane, tetradecane, acid treated kerosene oils, heavy naphtha, middle distillates, etc. may be used in proportions of 1–5 pounds of diluent per pound of aluminum at reaction temperatures of about 100°–150° C. The sesquihalides are highly useful intermediates for the preparation of other alkyl aluminum compounds.

For example, dialkyl aluminum halide may be prepared by reacting alkyl aluminum sesquihalide with a reducing metal such as sodium added in increments at temperatures of about 120°–180° C., e.g. 140°–160° C., in the case of diethyl aluminum chloride. Similarly, trialkyl aluminum may be prepared in a similar manner by reacting dialkyl aluminum halide with sodium. In accordance with the invention, these methods may be greatly improved by using the diluents described above. For example, the sodium may be added in the form of a slurry or dispersion in the solvent whereby addition under the exclusion of air is greatly simplified. Even rapid addition of sodium becomes possible without overheating particularly when using a solvent which boils in the neighborhood of the maximum desired reaction temperature, because the solvent will tend to flash at excessive temperatures, thus exercising an automatic temperature control. Solvents such as decane, dodecane, etc. are particularly suitable for this purpose.

While halides and alkyl groups having 1–10 carbon atoms have been referred to in general, it is noted that chlorides and bromides are the preferred halides of the invention, while ethyl is the preferred alkyl radical.

The invention will be further illustrated by the following specific examples.

*Example I*

Ethyl aluminum sesquichloride was prepared using the following procedure: To a 2-liter glass reactor containing 150 gms. of aluminum powder (residue from a previous preparation) and a trace of ethyl aluminum sesquichloride was charged 150 gms. of aluminum powder and 400 ml. of a highly refined purified non-olefinic petroleum hydrocarbon diluent boiling from 200°–260° C. Ethyl chloride was then fed at atmospheric pressure and rate of 25–40 liters per hour as the temperature increased from 33°–135° C. Reaction was discontinued after 2.5 hours. After standing overnight at room temperature, the preparation was continued with the ethyl chloride feed rate being increased slowly to 70 liters per hour at 115°–125° C. After 1 hour at this rate, the reaction rate decreased slowly and the feed rate was lowered correspondingly. The reaction was terminated after a total of 6.5 run hours.

The product from this reaction along with the diluent was flash distilled at 95° C./9 mm. to 127° C./19 mm. Analysis of the distillate indicated 666 gms. of ethyl aluminum sesquichloride product. The yield was 49% of the theoretical.

Another batch of aluminum sesquichloride was prepared using essentially the same procedure, except that a smaller reactor was used. In this run, a 125 ml. reactor was used. The charge consisted of 27 gms. of aluminum powder, 50 ml. of the same hydrocarbon diluent, 3.8 ml. of ethyl bromide and 0.5 ml. of ethyl aluminum sesquichloride. Heat was applied to the reactor and ethyl chloride feed was cut in. The feed rate was rapidly raised to 7.2 liters per hour and the reactor temperature was maintained at 112°–126° C. The reaction was voluntarily terminated at the end of 3 hours when the reactor was full. The yield of sesquichloride was 58% of theory based on ethyl chloride absorbed. Conversion of the ethyl chloride was approximately 98%.

The essential conditions and results obtained in these experiments are summarized below:

| Run No. | 1 | 2 |
| --- | --- | --- |
| Temperature (maximum), ° C | 135 | 126 |
| Pressure | (¹) | (¹) |
| Aluminum, gms | 300 | 27 |
| Ethyl chloride absorbed, gms | (²) | 55 |
| Diluent, ml | 400 | 50 |
| Run length, hours | 6.5 | 3 |
| Yield, percent of theory based on Al charged | 49 | ³ 58 |

¹ Atmospheric.
² Not determined.
³ Run terminated voluntarily when reactor filled.

It will be noted that very good yields were obtained within practical operating times using a diluent boiling close to, but above, the reaction temperature. On the other hand, when normal heptane was used in place of the 200°–260° C. hydrocarbon fraction at otherwise equal conditions, the reaction rate was so low that no attempt was made to isolate a product, chiefly because the boiling point of n-heptane is too low to permit adequate reaction temperatures.

In another run made under conditions identical to those of run 2, but with diluent absent, only 73% of the ethyl chloride was converted as compared to 98% conversion in run 2.

*Example II*

In an effort to prepare a larger batch of ethyl aluminum sesquichloride, the following experiment was carried out: A 5 gallon steel reactor was charged with 2 pounds of aluminum powder (90% metallic aluminum) and 1,047 gms. of ethyl aluminum sesquichloride. Ethyl chloride was then fed at 1.5–2.6 pounds per hour as the reactor was heated from room temperature to 127° C. Immediately after cutting in feed, deposits of polymeric materials formed in the feed inlet and later during the run in the overhead vent line, causing plugging difficulties throughout the run. The run was continued for 7.5 hours with reactor temperatures maintained at 100°–127° C. An additional 2 pounds of aluminum was charged and reaction continued for 5 hours. On attempted distillation of the liquid product, no distillate was obtained. The reaction products were found to consist mainly of aluminum chloride, hydrogen chloride and a viscous polymeric liquid.

The same experiment was repeated except that the aluminum powder was suspended in 1.25 gallons of a highly refined, non-olefinic petroleum hydrocarbon liquid boiling at 200°–260° C. The conditions and results of these experiments are summarized in the table below.

| Run No. | 3 | 4 |
| --- | --- | --- |
| Temperature, ° C | 100–127 | 93–121 |
| Pressure | (¹) | (¹) |
| Aluminum, lbs. (90% purity) | 4 | 5 |
| Ethyl chloride absorbed, lbs | (²) | 13.2 |
| Diluent, gals | 0 | 1.25 |
| Run length, hrs | 12.5 | 11 |
| Yield, percent of theory | 0 | 82 |

¹ Atmospheric.
² Not determined.

In run 3, which was carried out in the absence of diluent, the reaction led almost entirely to side products, such as AlCl₃, HCl and polymer. In run 4 an excellent yield of sesquihalide was obtained. The sesquihalide after sodium treatment yielded a distillate containing 61% by weight of aluminum alkyls in the diluent. The over-all yield at this point was 50% of theory, based on Al charged.

*Example III*

Diethyl aluminum chloride was prepared as follows: Seven pounds of aluminum powder (90% purity) was converted to ethyl aluminum sesquichloride in a 10 gallon steel reactor according to the general procedure above (Example II, run 2). The diluent used in the start-up, however, was Nujol, a highly naphthenic, heavily acid-treated petroleum oil boiling above 330° C. The aluminum was activated by agitation with 308 gms. of a 30% ethyl aluminum sesquichloride solution in the 200°–260° C. hydrocarbon fraction of the previous examples. The sesquichloride product was not isolated, but the yield was estimated as 23.6 lbs.

The ethyl aluminum sesquichloride was treated at 145°–165° C. with 3.24 pounds of metallic sodium added in 10–20 gm. chunks over a period of 5 hours. The product from this reaction was flash distilled to yield 14.0 pounds of diethyl aluminum chloride of 98% purity. The yield was 82% of theory, based on the sesquichloride yield.

The reactor was readily cleaned after this distillation due to the slurrying effect of the high boiling diluent on the solids.

A similar experiment using a lower boiling diluent was carried out in essentially the same manner, except that the 200°–260° C. hydrocarbon fraction of the previous examples was used in place of Nujol as the diluent. The conditions and results of these experiments were as tabulated below:

| Run No. | 5 | 6 |
|---|---|---|
| Diluent type | Nujol | 200°–260° C. (hydrocarbon fraction. |
| Temperature, °C | 103–129 | 93–121. |
| Pressure | Atmospheric | Atmospheric. |
| Aluminum, lbs | 7 | 5. |
| Ethyl Chloride absorbed, lbs | 18.2 | 13.2. |
| Diluent, gals | 1.5 | 1.25. |
| Yield of sesquichloride, lbs | 23.6 | 16.9. |
| Sodium, lbs | 3.24 | 2.32. |
| Yield of AlEt$_2$Cl, percent of theory based on Al | 67 | 50. |
| Percent AlEt$_2$Cl in product | 98 | 61. |
| Time required to clean up unit after run | 2 shifts—2 men—no dismantling required. | 7 shifts—4–6 people—unit dismantled. |

As indicated, when the 200°–260° C. fraction was used, it distilled with the reaction products leaving a hard dry cake of salt and unreacted aluminum. This froze the agitator and required removal of the reactor head to free the stirrer and clean the reactor.

The invention is not limited to the specific figures of the foregoing examples. The relative proportions of the materials used and the reaction conditions may be varied within the limits indicated in the specification to obtain products of varying characteristics.

What is claimed is:

1. A method of preparing a $C_1$ to $C_{10}$ alkyl aluminum compound which comprises contacting powdered aluminum with a $C_1$ to $C_{10}$ alkyl halide in an inert non-olefinic, non-aromatic diluent boiling above about 260° C. and substantially above the boiling point of said alkyl aluminum compound, maintaining the temperature of the resulting mixture between about 100 and 150° C. for a sufficient time to form a sesquihalide and thereafter contacting said sesquihalide with a reducing metal at a temperature between about 120 and 180° C. for a sufficient time to form an alkyl aluminum compound and recovering the $C_1$ to $C_{10}$ alkyl aluminum compound by distillation substantially free of said diluent.

2. A method of preparing a di- to tri-ethyl aluminum compound which comprises contacting powdered aluminum with an ethyl halide in an inert non-olefinic, non-aromatic diluent boiling above 330° C. and substantially above thne boiling point of said ethyl aluminum compound, maintaining the temperature of the resulting mixture between about 100 and 150° C. for a sufficient time to form a sesquihalide and thereafter contacting said sesquihalide with sodium dispersed in said diluent at a temperature between about 120 and 180° C. for a sufficient time to form a di- to tri-ethyl aluminum compound and distilling the mixture to recover di- and tri-ethyl aluminum compound which is substantially free of said diluent.

3. A method according to claim 2 in which the ethyl halide is ethyl chloride.

4. A method according to claim 2 in which the ethyl aluminum compound prepared is tri-ethyl aluminum.

5. A method according to claim 2 in which the powdered aluminum is admixed with an ethyl aluminum sesquihalide prior to contacting it with the ethyl halide.

6. A method of preparing a di- to tri- $C_1$ to $C_{10}$ alkyl aluminum compound which comprises contacting powdered aluminum with a $C_1$ to $C_{10}$ alkyl halide in an inert non-olefinic, non-aromatic diluent boiling above 330° C. and substantially above the boiling point of said alkyl aluminum compound, maintaining the temperature of the resulting mixture between about 100 and 150° C. for a sufficient time to form a sesquihalide and thereafter contacting said sesquihalide with an alkali metal dispersed in said diluent at a temperature between about 120 and 180° C. for a sufficient time to form a di- to tri- $C_1$ to $C_{10}$ alkyl aluminum compound and distilling the mixture to recover di- to tri- $C_1$ to $C_{10}$ alkyl aluminum compound which is substantially free of said diluent.

References Cited in the file of this patent

UNITED STATES PATENTS

| 2,691,668 | Ziegler et al. | Oct. 12, 1954 |
| 2,712,546 | Coates et al. | July 5, 1955 |
| 2,744,127 | Ziegler et al. | May 1, 1956 |
| 2,863,894 | Smith | Dec. 9, 1958 |